United States Patent
Cordier et al.

(10) Patent No.: US 6,963,553 B1
(45) Date of Patent: Nov. 8, 2005

(54) METHOD OF ADJUSTING A SIGNAL QUALITY TARGET TO BE REACHED IN POWER CONTROL PROCEDURES IN A CDMA RADIO COMMUNICATION NETWORK AND A CORRESPONDING TRANSCEIVER

(75) Inventors: Christophe Cordier, Paris (FR); Pierre Roux, Argentueil (FR); Alejandro De Hoz Garcia-Bellido, Boulogne-Billancourt (FR); Cédric Bourgoin, Paris (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/572,461

(22) Filed: May 17, 2000

(30) Foreign Application Priority Data

Feb. 21, 2000 (EP) .................................. 00440052

(51) Int. Cl.⁷ ........................ H04L 12/28; H04L 12/56; H04J 3/12; H04Q 7/20
(52) U.S. Cl. ...................... 370/342; 370/391; 370/522; 375/224; 455/525
(58) Field of Search .............................. 370/335–391, 370/522; 375/205–225, 239, 259–296; 455/425–453, 455/522–525

(56) References Cited

U.S. PATENT DOCUMENTS

| | | | | |
|---|---|---|---|---|
| 5,629,934 A * | 5/1997 | Ghost et al. | ................ | 370/335 |
| 5,790,596 A * | 8/1998 | Sexton | ........................ | 375/228 |
| 5,822,318 A * | 10/1998 | Tiedemann, Jr. et al. | ... | 370/391 |
| 5,893,035 A * | 4/1999 | Chen | ........................... | 455/522 |
| 6,084,904 A * | 7/2000 | Wang et al. | ................ | 375/130 |
| 6,128,506 A * | 10/2000 | Knutsson et al. | ........... | 455/522 |
| 6,181,738 B1 * | 1/2001 | Chheda et al. | .............. | 375/224 |
| 6,226,283 B1 * | 5/2001 | Neumiller et al. | .......... | 370/340 |
| 6,285,886 B1 * | 9/2001 | Kamel et al. | ............... | 455/522 |
| 6,289,217 B1 * | 9/2001 | Hamalainen et al. | ....... | 455/425 |
| 6,298,242 B1 * | 10/2001 | Schiff | .......................... | 455/522 |
| 6,405,021 B1 * | 6/2002 | Hamabe | ..................... | 455/69 |
| 6,430,398 B1 * | 8/2002 | Blanc | ........................ | 455/67.13 |
| 6,493,541 B1 * | 12/2002 | Gunnarsson et al. | .......... | 455/69 |
| 6,535,723 B1 * | 3/2003 | Jiang et al. | ................. | 455/245 |
| 6,549,785 B1 * | 4/2003 | Agin | .......................... | 455/522 |
| 6,636,723 B1 * | 10/2003 | Kitagawa et al. | ............. | 455/69 |

* cited by examiner

*Primary Examiner*—Man U. Phan
(74) *Attorney, Agent, or Firm*—Sughrue Mion, PLLC

(57) ABSTRACT

A method of adjusting a signal quality target at a transceiver of a CDMA radio communication network. The adjustment of the signal quality target ensures that a predefined frame quality target is reached in power control procedure. According to the invention, the method consists in computing for a received frame, a frame quality indicator depending on signal quality indicators measured at slot level in the received frame. The method further comprises a step of adjusting the signal quality target according to the difference between the frame quality indicator and the predefined frame quality target.

13 Claims, 3 Drawing Sheets

METHOD OF ADJUSTING A SIGNAL QUALITY TARGET TO BE REACHED IN POWER CONTROL PROCEDURES IN A CDMA RADIO COMMUNICATION NETWORK AND A CORRESPONDING TRANSCEIVER

BACKGROUND OF THE INVENTION

The present invention relates to digital mobile radio communication systems and more particularly to a method for adjusting a signal quality target to be reached in power control procedures at a transceiver of a code division multiple access (CDMA) radio communication network.

Power control procedures are usually performed in CDMA radio communication systems in order to ensure a required received signal quality at a receiver with the minimum of power transmitted by a transmitter. Power control procedures comprise on the one hand the inner-loop power control and on the other hand the outer-loop power control. Inner-loop power control refers to the mechanism to make the transmitter adapt its transmitted power in order to reach a current required signal quality target. The object of outer-loop power control is to adjust dynamically the required signal quality target according to current signal propagation conditions and link quality.

In the description below, the signal quality is evaluated by means of signal quality indicators and a signal quality target to be reached is defined. Signal quality indicators as well as signal quality target are for example represented in terms of bit energy related to a spectral noise density (Eb/N0). Alternatively, another representation of these quantities can be a signal to interference ratio (SIR).

The signal preferably carries a frame structure, each frame being divided in slots. Concurrently to signal quality, frame quality is also taken into account. The frame quality is evaluated for a frame thanks to frame quality indicators and a frame quality target to be reached is also defined. Frame quality indicator as well as frame quality target are for example represented in terms of bit error rate (BER) or frame error rate (FER). Bit error rate quantity is particularly adapted for data transmission while frame error rate is more relevant for voice transmission.

A common method of adjusting a signal quality target to be reached in power control procedures consists in increasing or decreasing the signal quality target in a discrete manner by fixed steps so that the signal quality target tracks as close as possible the changing propagation conditions.

A fixed step strategy can be used if the adjustment of the signal quality target relies on a cyclic redundancy check (CRC) performed for each frame to detect frame errors. Thus, if the CRC of the currently received frame is wrong, the signal quality target is increased by a first predefined fixed step and if the CRC of the currently received frame is not erroneous, the signal quality target is decreased by a second predefined step. The first and the second predefined steps may be identical or different. However and because of their random nature, single frame errors are not representative of short term propagation conditions. An error-based decision scheme proves only reliable in the long run.

A more accurate method of adjusting the signal quality target described in prior art adopts a variable step size strategy. In that case, the adjustment is the result of a long term frame quality evaluation. A frame error rate is evaluated thanks to CRC calculation over a predefined sufficient number of frames. The step size to adjust the signal quality target is chosen according to the frame error rate evaluation. In that case an accurate frame quality evaluation requires a large number of frames, which causes a significant delay in the adjustment of the signal quality target. A substantial disadvantage is that such a method responds poorly to abrupt changes of propagation conditions.

Another disadvantage is that this method is only fitted for voice services, where end-quality is adequately described by a frame error rate. For data services, however, a bit error rate is more representative to describe the end-quality than a frame error rate.

SUMMARY OF THE INVENTION

A particular object of the present invention is to rely on a short term frame quality indicator no more depending on CRC calculation.

Another object of the invention is to provide a method of outer-loop power control fitted for voice and data services.

These objects, and others that appear below, are achieved by a method of adjusting a signal quality target at a transceiver of a CDMA radio communication network which is receiving a signal carrying a frame structure each frame being divided in slots. The adjustment of the signal quality target is meant to ensure that a predefined frame quality target is reached in power control procedures. The method comprises a step of computing, for a received frame, a frame quality indicator depending on signal quality indicators measured at slot level in the received frame. The method further comprises a step of adjusting the signal quality target according to the difference between the frame quality indicator and the predefined frame quality target.

An advantage of the present invention is to obtain a short term frame quality indicator which allows to track abrupt variations of propagation conditions and guarantees, for example, an immediate response to soft handover transitions.

Another advantage of the present invention is that since the adjustment of the signal quality target is faster and more accurate, it prevents the transceiver of a CDMA radio communication network from transmitting excessive power and consequently enhances the capacity of the CDMA radio communication network.

The present invention also concerns a transceiver of a CDMA radio communication network according to claims 6 to 9, and a radio network controller according to claim 10.

BRIEF DESCRIPTION OF THE DRAWINGS

Other characteristics and advantages of the invention will appear on reading the following description of a preferred implementation given by way of non-limiting illustrations, and from the accompanying drawings, in which.

DETAILED DESCRIPTION OF THE INVENTION

Figure 1:
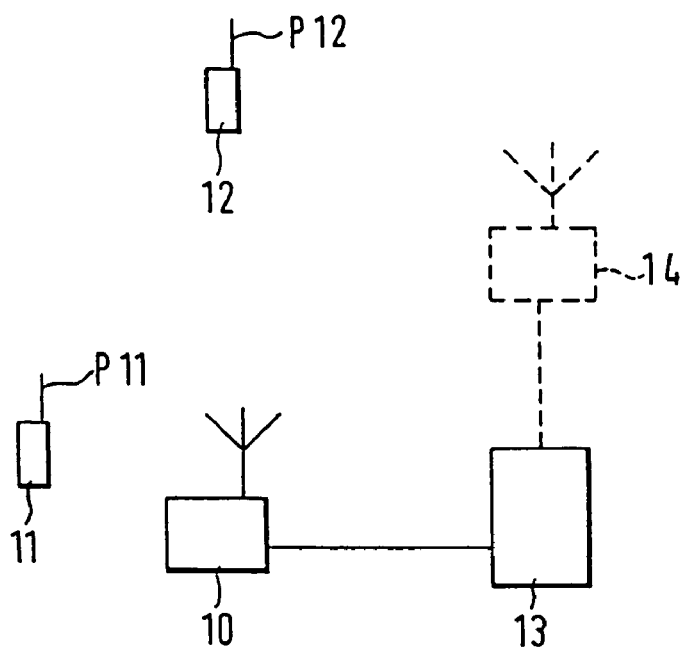
FIG. 1 shows a typical mobile radio communication network.

FIG. 1 illustrates a mobile radio communication network, for example a CDMA radio communication system comprising mobile terminals 11, 12, a fixed station 10 and a radio network controller 13.

Mobile terminal 11, respectively mobile terminal 12, communicates with fixed station 10 by sending a signal over a radio channel with a transmitting power P11, respectively P12. Fixed station 10 is connected to radio network controller 13 controlling possibly other fixed stations 14 of the CDMA radio communication network.

The transmitting powers P11 and P12 are dynamically adapted thanks to an inner-loop power control procedure according to quality measurements processed at fixed station 10 or at radio network controller 13. Commands to adapt the values P11 and P12 are transmitted over a radio signaling channel between fixed station 10 and mobile terminals 11, 12.

The inner-loop power control ensures that the signal received from mobile terminal 11, respectively mobile terminal 12, fulfills a current signal quality target. The current signal quality target at the entry of fixed station 10 is determined in order to guarantee a predefined frame quality target, after decoding of the signal, required by the network. The predefined frame quality target is in general service dependant. For voice services telephony it can for example correspond to a frame error rate of 0.01 and for a special class of data services it may correspond to a bit error rate of $10^{-5}$.

The determination of the appropriate current signal quality target corresponding to the required frame quality target after decoding is the object of the outer-loop power control and depends essentially on propagation conditions.

Figure 2:
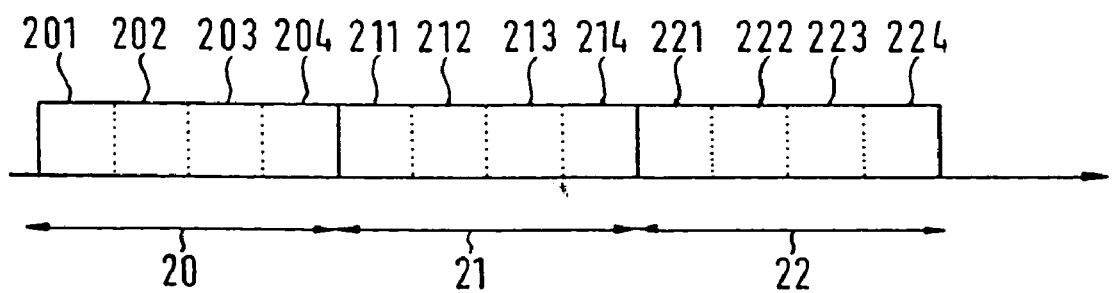
FIG. 2 shows the frame and slot structures of a signal transmitted on a radio channel.

FIG. 2 illustrates the structure of the signal transmitted from mobile terminal 11, respectively mobile terminal 12, to fixed station 10. The signal is constituted of a succession of frames 20, 21, 22 and each frame 20, 21, 22 is divided in slots 201, ..., 204, 211, ..., 214, 221, ..., 224. The slot size, number of slots in a frame as well as the size of a frame are system parameters. The elementary entity of a slot or a frame is a bit or a chip. Before being transmitted on the air channel, this signal is modulated and preferably spread with a PN sequence. The signal is also preferably interleaved before being transmitted on the radio channel with a predefined interleaving period. The interleaving period comprises a predefined number of slots but may be different from the frame duration defined as system parameter. However it is assumed for this invention that a frame has to be understood as a predefined number of slots. As a consequence, as well the frame defined as system parameter as the interleaving period have to be considered as frames. After reception at the antenna of the fixed station 10, the signal is despread and demodulated.

Figure 3A:
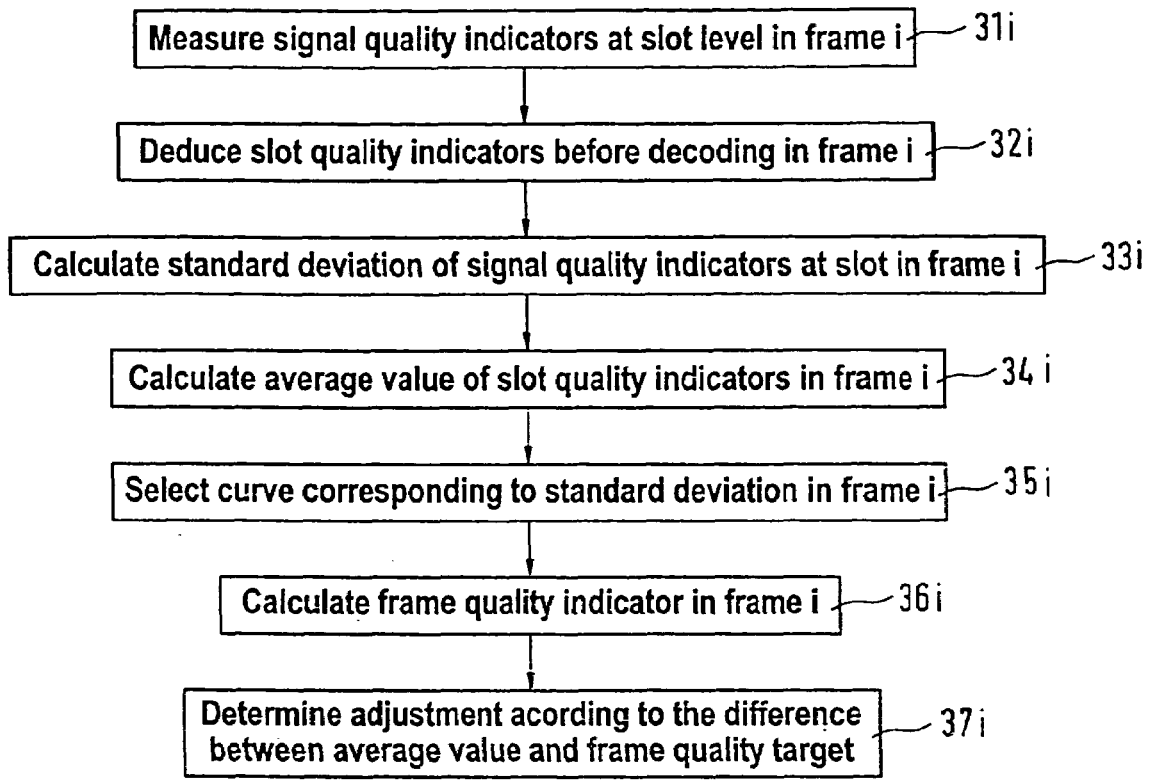
FIGS. 3A and 3B are flow diagrams of the different steps of two implementations of the method according to the present invention.

FIG. 3A describes an embodiment of the method of adjusting the signal quality target to ensure that the predefined frame quality target is guaranteed for the current used service. Steps 31$i$ to 36$i$ are executed for each single frame.

Step 31$i$ consists in measuring signal quality indicators at slot level in a currently received frame, called frame i. For example, for frame 20, an energy per bit related to a spectral noise density $Eb/N0_1, \ldots, Eb/N0_4$ is measured for each slot 201, ..., 204 of frame 20.

Steps 32$i$ to 36$i$ illustrate how the signal quality indicators at slot level are used to deduce a frame quality indicator for the currently received frame.

Step 32$i$ consists in converting each signal quality indicator at slot level in a slot quality indicator before decoding. For example, the slot quality indicator before decoding can be a raw bit error rate before decoding. The conversion relies on a predefined non-linear relation. The predefined non-linear relation is channel-independent and depends solely on the characteristics of the despreading and demodulation process. For a given network configuration, the relation is unique and not affected by any moves of mobile terminals 11, 12. This relation is preferably obtained by simulation and is also preferably interpolated by a polynomial curve represented by the polynomial function P giving the following relation:

$$\text{rawBER(slot)} = P(Eb/N0(\text{slot})).$$

Consequently, a set of slot quality indicators before decoding, rawBER(slot), are generated out of a set of signal quality indicators at slot level, Eb/N0(slot).

Step 33$i$ consists in calculating a value related to variations of the signal quality indicators at slot level measured in the currently received frame. This value may be the standard deviation value, the variance or any quantity representing the variations of the signal quality indicators measured at slot level in a frame. Instead of measuring a value related to the standard deviation of the signal quality indicator at slot level, Eb/N0(slot), a value related to the standard deviation of slot quality indicators before decoding rawBER(slot) may also be used.

Step 34$i$ consists in generating the average value of the slot quality indicators before decoding rawBER(slot) along the frame. This step enables it to get rid of interleaving effects and associates a single frame quality value before decoding to the currently received frame. In this example it is assumed that a frame is as large as the interleaving period.

The relation between the frame quality indicator before decoding and the frame quality indicator obtained after decoding was found to be a network of curves parameterized by a value related to the standard deviation of signal quality indicators at slot level. Each curve of the network of curves is preferably approximated by polynomial curve, which coefficients are parameterized by the value related to the standard deviation of the signal quality indicators measured at slot level in the received frame. The curves and the coefficients of the polynomial may be obtained by simulation.

Step 35$i$ consists in selecting the curve of the network of curves corresponding to the value related to the standard deviation of the signal quality indicators measured at slot level in the frame obtained at step 33$i$.

Step 36$i$ consists in calculating the frame quality indicator by applying the frame quality indicator before decoding obtained at step 34$i$ to the polynomial function selected at step 35$i$.

The further steps of the method illustrate how the signal quality target is adjusted according to the difference between the deduced frame quality indicator of frame i and the predefined frame quality target.

In a first embodiment of the invention, once the frame quality indicator has been evaluated for frame i, it is confronted to the frame quality target resulting if necessary to the adjustment of the required signal quality target. Step 37$i$ consists in comparing the average value of the frame quality indicators to the predefined frame quality target. If the average value is smaller than the target value the signal quality target is decreased by a value STEP UP, if it is higher the signal quality target is increased by a value STEP DOWN. The values STEP UP AND STEP DOWN are preferably proportional to the gap between the average frame quality indicator and the frame quality target.

Figure 3B:
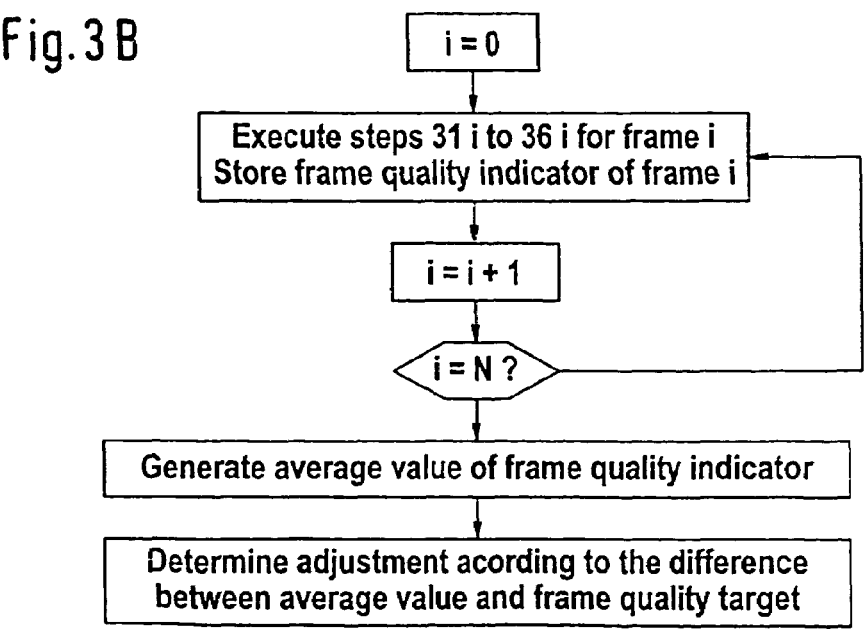

In another embodiment of the invention showed on FIG. 3B, an update period encompassing N frames is considered. N is preferably a small number which has not the inconvenient to delay too much the adjustment of the signal quality target. Step 300 to 302 describe the adjustment procedure.

Step 300 consists in generating an average value of the frame quality indicators estimated for each one of the N frames according to steps 31$i$ to 36$i$.

Step 301 consists in generating the average value of the frame quality indicators for the N considered frames.

Step 302 consists in determining the adjustment to apply to the signal quality target. If the average frame quality indicator is lower than the frame quality target, the signal quality target is decreased by a value STEP UP, if it is higher the signal quality target is increased by a value STEP DOWN. The values STEP UP AND STEP DOWN are preferably proportional to the gap between the average frame quality indicator and the frame quality target.

Figure 4:
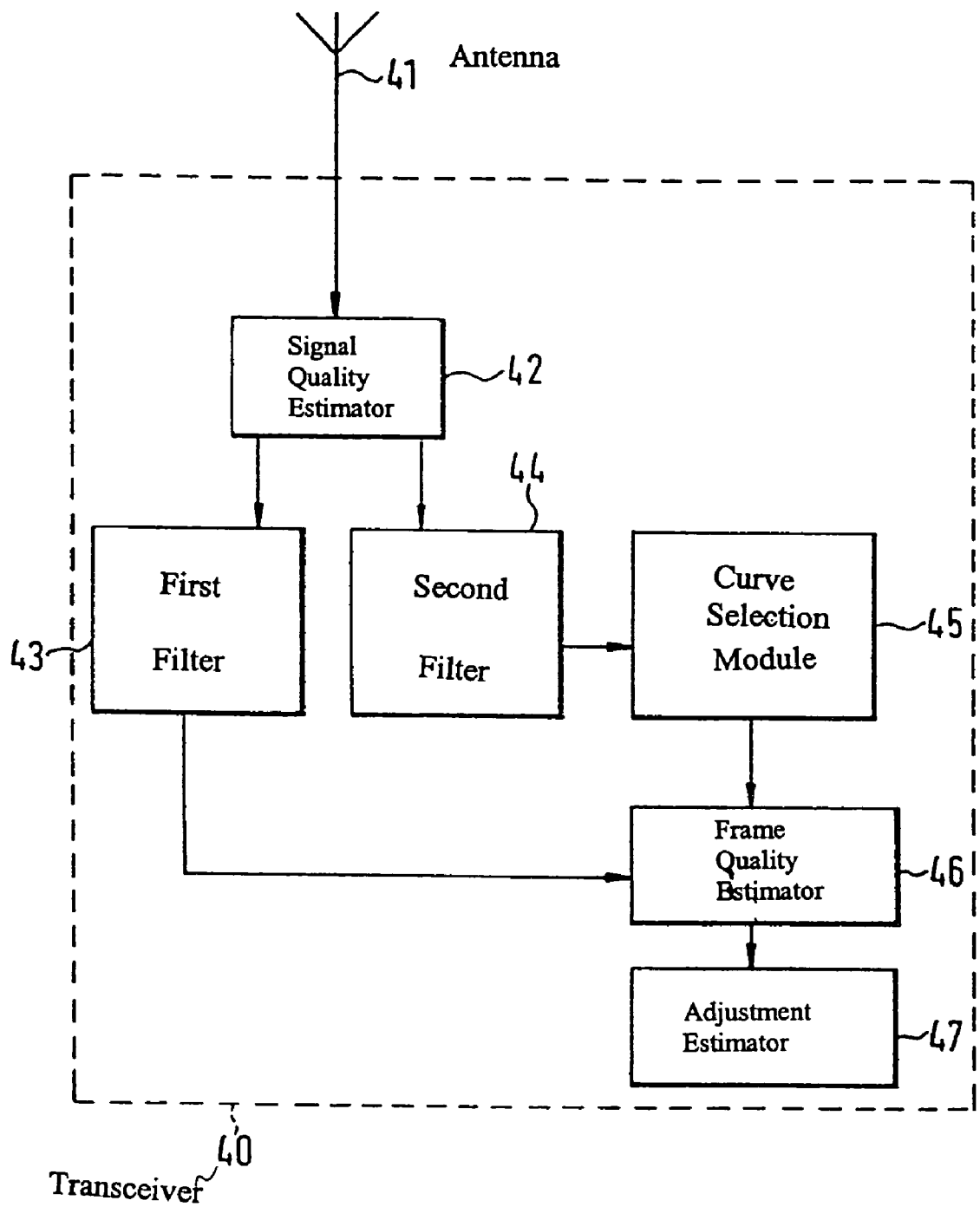
FIG. 4 represents an embodiment of a transceiver used in a CDMA radio communication network according to the invention.

FIG. 4 is a bloc diagram of an embodiment of a transceiver 40 belonging to a CDMA radio communication network according to the invention. Transceiver 40 corresponds preferably to mobile terminal 11 or mobile terminal 12 showed on FIG. 1.

Transceiver 40 comprises an antenna 41 to receive a radio signal. Antenna 41 is connected to a signal quality estimator 42 to measure signal quality indicators at slot level for each slot of a frame of the received signal. The signal quality estimator 42 is connected to a first filter 43 and to a second filter 44. The second filter 44 is connected to a curve selection module 45. The first filter 43 and the curve selection module 45 are connected to a frame quality estimator 46 which is in turn connected to an adjustment estimator 47 which adjusts the value of a signal quality target.

Signal quality estimator 42 is designed to measure for each slot of a currently received frame a signal quality indicator. This signal quality indicator is preferably an energy pro bit related to a spectral noise density (EB/N0). Alternatively it can also be a signal to interference ratio (SIR).

The measured signal quality indicators at slot level are inputs of the first filter 43, which is designed to convert each signal quality indicator at slot level, Eb/N0(i), in slot quality indicators before decoding by using a predefined non-linear function, named P, physically stored in a memory accessible by the first filter 43 and to average the obtained slot quality indicator before decoding for the frame period thus obtaining a raw frame quality indicator, noted rawBER. A mathematical expression of the filter function is:

$$rawBER = \frac{1}{M}\sum_{i}^{M} f_1 PEB/N0(i)$$

M corresponding to the number of slots in a frame.

The signal quality indicators at slot level measured in the currently received frame are also inputs for the second filter 44, which evaluate the variations of the signal quality indicators at slot level during the frame period. The variations are preferably estimated by calculating the standard deviation of the signal quality indicators measured at slot level for the frame period. Alternatively the variance could also be used. The calculated variations are used by the curve selection module to select among a set of curves parameterized by the variation the appropriate one. The curves of the set of curves are physically stored in a memory accessible by the curve selection module.

The frame quality estimator 46 converts the raw frame quality indicator calculated by first filter 43 by using the curve selected in the curve selection module 45 to obtain a frame quality indicator for the currently received frame. The adjustment estimator 47 determines the adjustment of the signal quality target according to the difference between the frame quality indicator and the predefined frame quality target.

In the uplink of the CDMA radio communication network, an outer-loop power control procedure has also to be done at the fixed station 10 showed on FIG. 1. The present invention also applies to the fixed station. The fixed station preferably contains only the signal quality estimator 42, the first filter 43 and the second filter 44, the curve selection module 45 as well as the adjustment estimator 46 being located in the radio network controller. The fixed station transmits preferably the frame quality indicator before decoding calculated in the first filter 42 and the variation of the signal quality indicators at slot level calculated in the second filter 43 to the radio network controller over a signaling channel.

The radio network controller comprises means for extracting these two values from the signaling channel and feeds the value representing the variation of signal quality indicators to the curve selection module 45 and the frame quality indicator before decoding to the adjustment estimator 46. Any other arrangement of the different modules (first filter 43, second filter 44, curve selection module 45 and adjustment estimator 46) between the fixed station and the radio network controller may be implemented on condition that the information exchange between the fixed station and the radio network controller is properly defined.

What is claimed is:

1. A method of adjusting a signal quality target at a transceiver of a code division multiple access (CDMA) radio communication network, said transceiver receiving a signal carrying a frame structure, each frame being divided into slots, said signal quality target ensuring that a predefined frame quality target is reached in power control procedures, said method comprising:
    computing for a received frame, a frame quality indicator depending on signal quality indicators measured slot by slot in said received frame; and
    adjusting said signal quality target according to the difference between said frame quality indicator and said predefined frame quality target;
    wherein said frame quality indicator depends on variations of said signal quality indicators measured slot-by-slot in said received frame, said variations being represented by a value related to a standard deviation of said signal quality indicators measured slot-by-slot in said received frame.

2. The method according to claim 1, wherein said frame quality indicator further depends on an average value of slot quality indicators before decoding, each slot quality indicator before decoding being derived from one of said signal quality indicators measured slot-by-slot in said frame based on a predefined non linear relation.

3. The method according to claim 2, wherein the relation between said frame quality indicator and said average value of said slot quality indicators before decoding is a polynomial whose coefficients are parameterized by said value related to a standard deviation of said signal quality indicators measured slot-by-slot in said received frame.

4. The method according to claim 1, wherein said frame is chosen as large as an interleaving period.

5. A transceiver part of a code division multiple access (CDMA) radio communication network, said transceiver receiving a signal carrying a frame structure, each frame being divided in slots, characterized in that said transceiver comprises:
   a signal quality estimator to measure signal quality indicators at slot level in a frame;
   a first filter to calculate an average value of slot quality indicators before decoding derived from said signal quality indicators measured at slot level by using a predefined non-linear relation; and
   a second filter to calculate a value related to variations of said signal quality indicators measured at slot level in said frame.

6. The transceiver according to claim 5, wherein said transceiver further comprises:
   a curve selection module to select one relation out of a set of predefined relations parameterized by said value related to variations of said signal quality indicators measured at slot level in said frame;
   a frame quality estimator to evaluate a frame quality indicator for said frame; and
   an adjustment estimator to adjust a signal quality target according to the difference between said frame quality indicator and a predefined frame quality target.

7. The transceiver according to claim 5, wherein said transceiver is a mobile station of a CDMA radio communication network.

8. The transceiver according to claim 5, wherein said transceiver is a fixed station of a CDMA radio communication network.

9. A radio network controller part of a code division multiple access (CDMA) radio communication network, said radio network controller adjusting a signal quality target to ensure a predefined target frame quality, characterized in that said radio network controller comprises:
   an input receiver to receive a parameter corresponding to a variation of a signal quality indicator in a frame;
   a curve selection module to select one relation out of a set of predefined relations parameterized by said value related to variations of said signal quality indicators measured at slot level in said frame;
   a frame quality estimator to evaluate a frame quality indicator for said frame; and
   an adjustment estimator to adjust said signal quality target according to the difference between said frame quality indicator and said predefined frame quality target.

10. A transceiver of a code division multiple access (CDMA) radio communication network, said transceiver receiving a signal carrying a frame structure, each frame being divided into slots, said transceiver comprising:
    a signal quality estimator configured to detect a frame quality indicator based on a signal quality indicator measured slot by slot in a received frame; and
    an adjustment estimator configured to adjust a signal quality target based on a difference between the frame quality indicator and a predetermined frame quality target;
    wherein the frame quality indicator depends on variations of the signal quality indicator measured slot-by-slot in the received frame, the variations being represented by a value related to a standard deviation of the signal quality indicator measured slot-by-slot in the received frame.

11. The transceiver of claim 10, wherein the frame quality indicator further depends on an average value of slot quality indicators before decoding, each slot quality indicator before decoding being derived from the signal quality indicator measured slot-by-slot in the frame based on a predefined non linear relation.

12. The transceiver of claim 11, wherein the relation between the frame quality indicator and the average value of the slot quality indicators before decoding is a polynomial, the coefficients of the polynomial being parameterized by a value related to a standard deviation of the signal quality indicator measured slot-by-slot in the received frame.

13. The transceiver of claim 10, wherein the frame is selected to be as large as an interleaving period.

* * * * *